United States Patent [19]
Uchiyama

[11] 3,968,498
[45] July 6, 1976

[54] X-Y PLOTTER INCORPORATING NON-IMPACT, LIQUID JET RECORDING INSTRUMENT

[75] Inventor: Tadamitsu Uchiyama, Tokyo, Japan

[73] Assignee: Research and Development Laboratories of Ohno Co., Ltd., Yokohama, Japan

[22] Filed: June 3, 1974

[21] Appl. No.: 476,109

[30] Foreign Application Priority Data
July 27, 1973 Japan................................. 48-85093
July 27, 1973 Japan................................. 48-85096
July 30, 1973 Japan................................. 48-85677
July 31, 1973 Japan................................. 48-86024
Aug. 3, 1973 Japan................................. 48-87265

[52] U.S. Cl.................................. 346/29; 118/7; 118/11; 346/140 A
[51] Int. Cl.²................. G01D 9/40; G01D 15/18
[58] Field of Search............ 346/29, 75, 140; 118/7, 118/11

[56] References Cited
UNITED STATES PATENTS

| | | | |
|---|---|---|---|
| 3,060,429 | 10/1962 | Winston | 346/75 X |
| 3,510,878 | 5/1970 | Johnson | 346/75 X |
| 3,610,119 | 10/1971 | Gerber et al. | 354/4 |
| 3,781,907 | 12/1973 | Gerber | 346/140 |
| 3,828,357 | 8/1974 | Koeblitz | 346/140 |
| 3,887,928 | 6/1975 | Ohno et al. | 346/140 |

OTHER PUBLICATIONS

Greanias, E. C.; *Hydraulic–Electrostatic Printer;* IBM Tech. Disc. Bulletin, vol. 13, No. 5, Oct. 1970, pp. 1131–1132.
Chen et al.; *INR Jet Emitter;* IBM Tech. Disc. Bulletin, vol. 14, No. 9, Feb. 1972, p. 2797.

*Primary Examiner*—Joseph W. Hartary
*Attorney, Agent, or Firm*—Wenderoth, Lind & Ponack

[57] ABSTRACT

An X-Y plotter which effects non-impact recording by the application of a jet of liquid marking medium to a recording medium while the amount of liquid marking medium to be jetted towards the recording medium is controlled in accordance with the recording velocity. To this end, a signal generator is employed for generating an output signal in response to receipt of signals respectively indicative of the velocity of an X-axis carriage of the X-Y plotter and of the velocity a Y-axis carriage of the X-Y plotter. The output signal emerging from the signal generator indicates the recording velocity which is defined by the square root of the sum of the second power of the velocity of the X-axis carriage and that of the velocity of the Y-axis carriage. The amount of liquid marking medium to be jetted is controlled in response to the recording velocity so that the liquid marking medium can be jetted in an amount proportional to the recording velocity.

19 Claims, 21 Drawing Figures

X-Y PLOTTER INCORPORATING NON-IMPACT, LIQUID JET RECORDING INSTRUMENT

BACKGROUND OF THE INVENTION

1. Field of the Invention

The present invention relates to a liquid jet recording apparatus and, more particularly, to an X-Y plotter which effects non-impact or non-contact recording by the application of a jet of liquid marking medium to a recording medium while the amount of liquid marking medium to be jetted towards the recording medium is controlled in accordance with the recording speed.

2. Description of the Prior Art

It is known that an X-Y plotter is provided with X and Y drive units separately or simultaneously operable to move a recording head in one or both directions parallel respectively to the X and Y axes which intersect with each other. The recording head heretofore employed in the X-Y plotter utilizes a ball-point pen, a substantially cylindrical hollow pen, a pencil or any other similar recording instrument, which during recording slidingly contacts the recording medium on which information is to be recorded or drawn. It may be said that this type of X-Y plotter employs a contact recording technique in which the recording instrument contacts the recording medium to draw, for example, a line.

With the X-Y plotter employing the contact recording technique, it has been found that, because of the fact that the recording medium, the recording instrument and ink are required to be well balanced during, for example, recording or delineation of a line, the resultant line is susceptible to unclear and/or uneven reproduction. In addition, the follow-up characteristic during the high speed recording is not favorable and, therefore, the recording speed is limited to one meter per second. Moreover, when the width of a line being drawn is to be varied, the recording instrument then being used has to be replaced by another one that can draw a line of a desired width.

In the case where the recording instrument used in an X-Y plotter is in the form of a pencil, wear of the pencil that occurs as it is used to draw a line on the recording medium, is liable to cause uneven reproduction of the line and, because generally in an X-Y plotter employing the contact recording technique, the recording instrument should be mechanically moved up and down relative to the recording medium to respectively continue and interrupt the recording operation, it is not suited for high speed recording.

An X-Y plotter employing a non-impact or non-contact recording technique wherein the recording instrument does not contact the recording medium is disclosed, for example, in U.S. Pat. No. 3,689,932, patented on Sept. 5, 1972, wherein the recording head utilizes a light emitting instrument while the recording medium is in the form of a photosensitive sheet material. In this type of X-Y plotter, after the recording operation has been completed, the recording medium in the form of the photosensitive material must be developed and subsequently fixed before visual representation of information recorded on the recording medium is achieved. This means that the plotter of the above numbered patent requires facilities for the developing and fixing of the recording medium and, therefore, causes much inconvenience.

Apart from the X-Y plotter hereinabove discussed, as a method for applying liquid marking medium, for example, ink, onto the recording medium, an ink jet recording system is known which is largely employed in a facsimile recording device. This ink jet recording system is so designed that the amount of ink jetted towards the recording medium is fixed and, therefore, it cannot be directly applied as a recording instrument to an X-Y plotter which requires the velocity of movement of the recording head or instrument relative to the recording medium to vary from time to time during the recording operation. If it were applied to an X-Y plotter, the recording instrument would operate in such a manner that the line width and/or the line image density would vary with variation of the recording velocity and, therefore, recording or drawing of a line of uniform line width and density would be impossible.

Another ink jet recording system wherein a jet of ink is deflected so as to diverge from its normal path of travel towards the recording medium when the ink jet is to be interrupted is also known and, for example, disclosed in the U.S. Pat. No. 3,060,429, patented on Oct. 23, 1962. In this system, unnecessary ink that has been deflected without being applied to the recording medium should be recovered and, in addition, interruption of the ink jet can not be accurately performed.

SUMMARY OF THE INVENTION

Accordingly, an essential object of the present invention is to provide an X-Y plotter which effects non-impact recording by the application of a jet of liquid marking medium to a recording medium with substantial elimination of the various disadvantages and inconveniences inherent in any of the foregoing types of conventional X-Y plotter.

Another object of the present invention is to provide an X-Y plotter of the type referred to above whereby a line of uniform line width and line density can be drawn or recorded at a relatively high speed without any accompanying unclearness and/or unevenness and without being substantially affected by the recording speed.

A further object of the present invention is to provide an X-Y plotter of the type referred to above, wherein the amount of ink jetted towards the recording medium positioned below the recording instrument is controlled in accordance with the speed of movement of the recording head stationarily carrying the recording instrument.

A still further object of the present invention is to provide an X-Y plotter of the type referred to above, which is easy to operate, which does not require such processes as developing and fixing that are required in the aforesaid prior art device of a similar kind and which does not require any ink recovery system.

An essential feature of the present invention is to be understood as residing in the fact that the non-impact, ink jet recording system is employed in the X-Y plotter, thereby achieving a high speed recording of information on a recording medium substantially irrespective of the surface conditions of the recording medium and permitting a single and the same recording instrument to be utilizable for recording various types of lines of different line width.

Another feature of the present invention is to be understood as residing in the fact that, in order to permit the liquid marking medium to be jetted towards the recording medium in accordance with the speed of movement of the recording head, means are provided to generate an electrical signal indicative of the speed of movement of the recording head, i.e., the recording speed, which electrical signal is utilized to apply the liquid marking medium onto the recording medium in an amount proportional to such electrical signal, thereby attaining a line of uniform width and density.

A further feature of the present invention is to be understood as residing in the fact that X and Y drive units for driving the recording head in directions parallel to the X and Y axes, respectively, are utilized to provide a source of the electrical signal that is received by the recording head.

A still further feature of the present invention is to be understood as residing in the fact that liquid marking medium emerging from a jet nozzle of the recording instrument is intermittently applied to the recording medium so that no recovery system for unnecessary or excessive liquid marking medium is required which would interrupt the recording or drawing operation.

BRIEF DESCRIPTION OF THE DRAWINGS

These and other objects and features of the present invention will become apparent from the following description taken in conjunction with preferred embodiments thereof with reference to the accompanying drawings, in which;

FIG. 4 is a similar diagram to FIG. 1, showing an X-Y plotter according to another embodiment of the present invention.

DESCRIPTION OF THE PREFERRED EMBODIMENT

According to the present invention, there is provided an X-Y plotter which basically comprises a recording head fixed to a Y-axis carriage reciprocally movable above a recording medium in a direction parallel to the Y-coordinate, said Y-axis carriage being supported on a X-axis carriage reciprocally movable above the recording medium in a direction parallel to the X-coordinate that intersects the Y-coordinate, separate sources of signals from which electrical signals respectively indicative of speeds of movement of the Y-axis carriage and the X-axis carriage are generated, and a signal generator for processing the electrical signals from the separate signal sources to thereby generate an output signal utilizable to control the amount of liquid marking medium to be jetted from a capillary nozzle of the recording head in such a manner that the amount of the liquid marking medium to be jetted is proportional to the recording velocity that is determined by vector addition of the velocity of movement of the Y-axis carriage and that of the X-axis carriage or the square root of the sum of the second power of the velocity of movement of the Y-axis carriage and the second power of the velocity of movement of the X-axis carriage.

The recording medium hereinbefore and hereinafter referred to may be a sheet of paper, cloth, synthetic film or any other character receiving surface and the liquid marking medium hereinbefore and hereinafter referred to may be ink of any type, for example, water soluble or insoluble ink containing or not containing one or more organic solvents.

A relationship between the density of a line drawn or recorded on the recording medium used in the X-Y plotter and the amount of liquid marking medium applied or deposited on the recording medium to represent such line has been found to be generally proportional to each other, although it depends on the type of the liquid marking medium. Accordingly, it can be said that the thickness of a line drawn or recorded on the recording medium is in proportional relation to the amount of liquid marking medium that has been deposited on the recording medium per unit length or area of the line.

On the other hand, in the known ink jet recording system referred to hereinbefore, although the width of a line drawn or recorded on the recording medium depends on the type of liquid marking medium, the angle of inclination of the capillary nozzle relative to the recording medium and the amount of the liquid marking medium that has been deposited on the recording medium to represent such drawn line, the width of the line has been found proportional to the one third power of the amount of the liquid marking medium deposited per unit length of the drawn line if a jet of a given type of liquid marking medium emerging from the capillary nozzle onto a given type of recording medium is sufficiently fine. Accordingly, if such a known ink jet recording system, wherein the amount of ink jetted towards the recording medium per for a given period of time is fixed irrespective of the recording velocity, is applied in an X-Y plotter wherein the recording velocity varies from time to time during the recording operation, variation in the width and/or density of the resultant line occurs in such a way that, during the high speed recording of the line, a starting portion of the line, that has been recorded or drawn at the initiation of recording at which time the recording velocity is relatively low, is of relatively large width and relatively high density and, as the recording velocity attains a maximum, the density of the line thus recorded or drawn proportionally decreases. On the other hand, although the width of the resultant line does not vary so much as the density thereof, a relatively great reduction of the density of the resultant line is sufficient to give an impression that the apparent width of the resultant line has been considerably reduced.

In view of the foregoing, the X-Y plotter if provided with an ink jet recording system should be designed such that ink to be jetted from the capillary nozzle towards the recording medium is applied in an amount proportional to the recording velocity. By employing such a design, it will be appreciated that the amount of ink applied per unit length of a line that has been drawn thereby is fixed irrespective of the recording velocity and, therefore, the width and density of the resultant line are uniform all along the entire length of the line without being affected by the recordng velocity.

Methods for producing a jet of liquid marking medium heretofore available are many and include those wherein electrical power such as voltage, hydraulic pressure or magnetic power, or a combination thereof, is utilized to expel liquid marking medium in the form of a fine jet from the capillary nozzle onto the recording medium. No matter what methods may be employed in the X-Y plotter, the present invention should, however, be understood as including the employment of any of the jet producing methods wherein control of the supply of liquid marking medium from the capillary nozzle onto the recording medium in the form of a fine jet is made proportional to the recording velocity.

There are two types of jets of liquid marking medium which can be directed from the capillary nozzle towards the recording medium; one being in the form of a continuous stream which is often produced in the case where the liquid marking medium employed is ink containing one or more organic solvents and the jet is produced by the application of electrical power, and the other being in the form of a series of fine drops which is often produced in the case where the liquid marking medium is aqueous ink. Where the jet of liquid marking medium is in the form of a series of fine drops and if each two adjacent drops among these fine drops are spaced a sufficiently small distance from each other relative to the recording velocity, these drops after having been deposited on the recording medium are overlapped with each other sufficient to produce a continuous line on the recording medium.

Furthermore, the amount of liquid marking medium jetted towards the recording medium varies depending on the type of the liquid marking medium and the shape and dimensions of the capillary nozzle employed. However, with a given type of liquid marking medium, the amount of the liquid marking medium jetted can be controlled as desired by the adjustment of the thrust of the jet. In addition, where the jet is in the form of a series of fine drops as hereinbefore described, the amount of the jetted liquid marking medium per unit length of the resultant line can also be controlled by the adjustment of the distance between each two adjacent drops of these fine drops.

Before the description of the present invention with particular reference to the accompanying drawings proceeds, it should be noted that, for the sake of brevity, like parts are designated by like reference numerals throughout the accompanying drawings.

Figure 1:
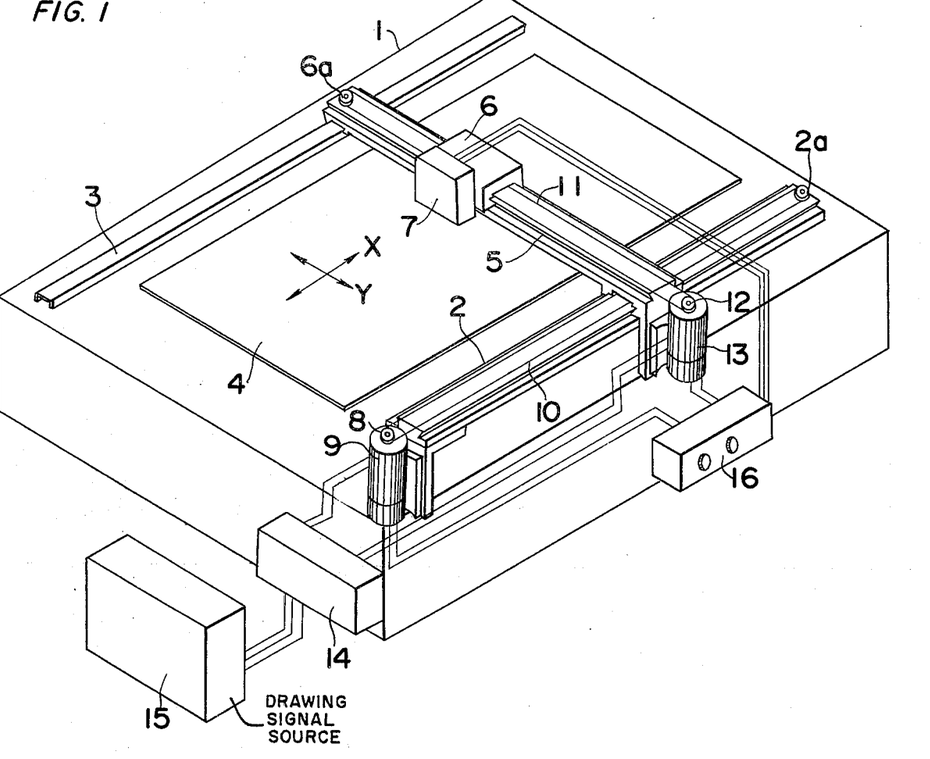
FIG. 1 is a perspective diagram schematically depicting an X-Y plotter according to one embodiment of the present invention.
Figure 2:
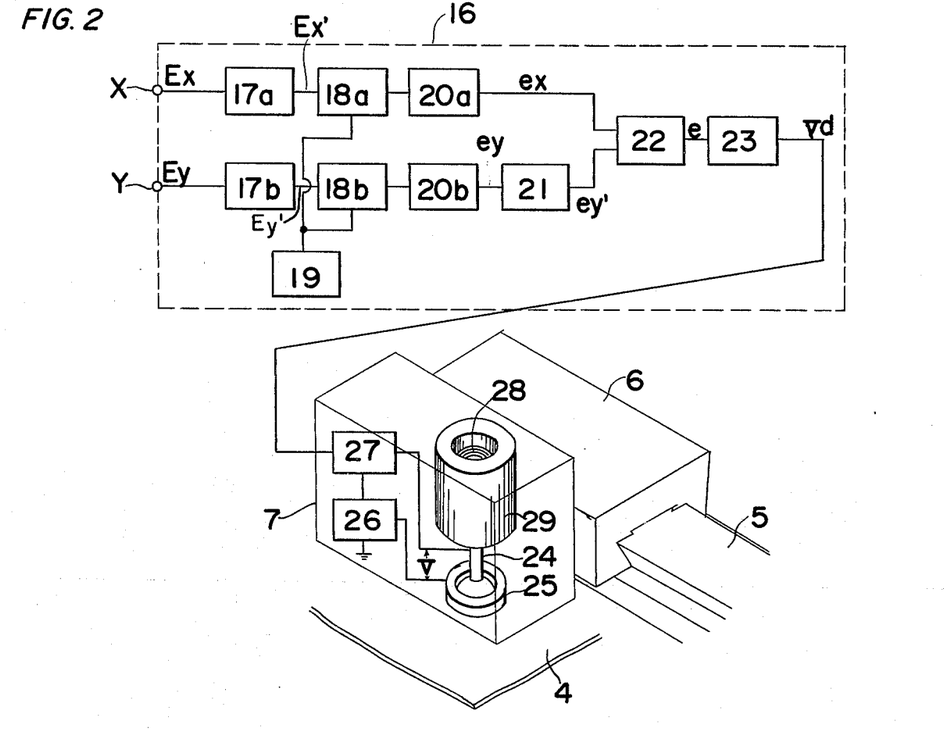
FIG. 2 is a block diagram showing an electrical circuit employed in the X-Y plotter of FIG. 1.
Figure 3:
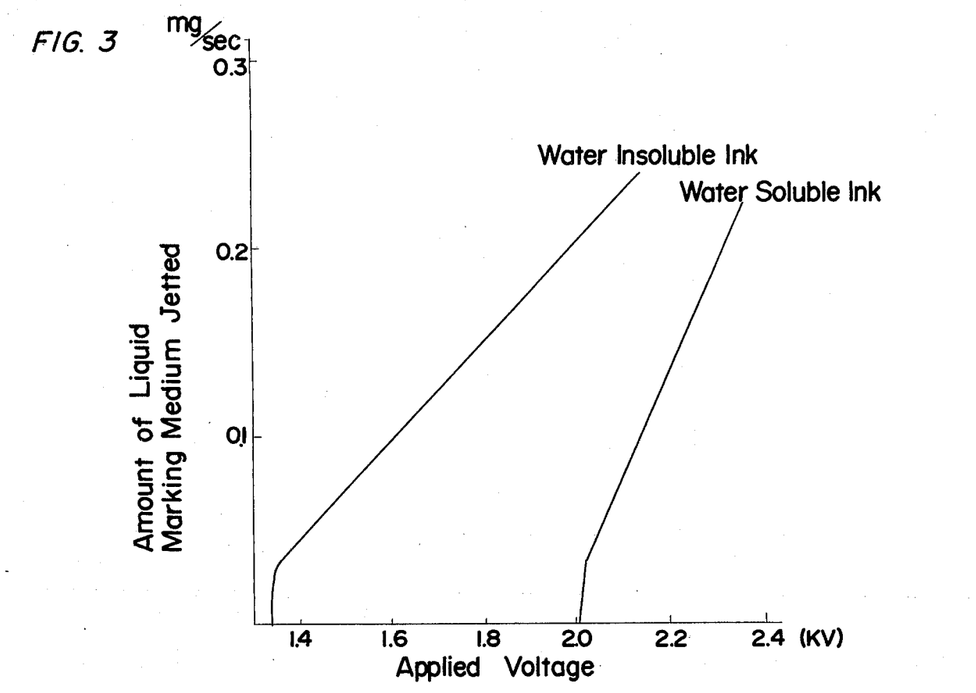
FIG. 3 is a graph showing a characteristic relationship between the voltage applied to a jet nozzle and the amount of liquid marking medium jetted from the jet nozzle.

Referring first to FIGS. 1 to 3, an X-Y plotter shown comprises a bench structure 1 having an upper surface on which is stationarily mounted a pair of spaced guide rails 2 and 3 both extending parallel to the X-coordinate. A portion of the upper surface of the bench structure 1 that is defined between the guide rails 2 and 3 provides a support table on which a recording medium, for example, a sheet 4 of paper, is stationarily, but replaceably, placed. An X-axis carriage 5 carrying a Y-axis carriage 6 in any known manner for movement thereon in a direction parallel to the Y-coordinate and to the lengthwise direction of the X-axis carriage 5 extends over the support table between the guide rails 2 and 3 with both ends thereof slidably engaged with said rails 2 and 3 in any known manner so that the X-axis carriage 5 with the Y-axis carriage 6 thereon can move in a direction parallel to the X-coordinate. A recording head 7 accommodating therein an ink reservoir 29 having a capillary nozzle 24 as will be described later in more detail is secured to the Y-axis carriage 6 for movement together therewith.

As clearly shown, one end of the guide rail has freely rotatably mounted thereon a pulley 2a and, adjacent the other end of said guide rail 2, a drive pulley 8 is provided. The drive pulley 8 is non-rotatably mounted on a drive shaft of an electrically operated servo motor 9 supported in position within the bench structure 1 in any known manner and the rotational force of the drive pulley 8 exerted during operation of the servo motor 9 is transmitted to the X-axis carriage 5 by means of a transmission system, for example, an endless cable 10 suspended between said pulleys 2a and 8 whereby the X-axis carriage can be moved in either direction parallel to the X-coordinate depending on the direction of rotation of the drive pulley 8 and, hence, the servo motor 9.

Similarly, another endless cable 11 is suspended between a pulley 6a freely rotatably mounted on one end of the X-axis carriage 5 and a drive pulley 12 non-rotatably mounted on a drive shaft of an electrically operated servo motor 13 supported in a substantially similar manner to the servo motor 9, whereby a rotational force of the drive pulley 12 exerted during operation of the servo motor 13 can be transmitted to the Y-axis carriage 6 thereby causing the latter together with the recording head 7 to move in either direction parallel to the Y-coordinate depending on the direction of rotation of the drive pulley 12 and, hence, the servo motor 13.

The arrangement so far described except for the details of the recording head as will be described later may be of any known construction and, for example, such as is disclosed in any of various patents showing such apparatus.

These servo motors 9 and 13 are operated by instructions in the form of a pulse frequency or in the form of a D-C voltage that is supplied thereto through a connector box 14 from a drawing signal source 15, such as a computer, that generates such instructions in accordance with a predetermined program. Servo outputs from the respective motors 9 and 13 that are available in the form of D-C voltages proportional to the respective velocities of movement of the carriage 5 and 6 are in turn fed to a signal generator 16 through X and Y terminals. The signal generator 16 is designed so as to, upon receipt of one or both of the servo outputs from the motors 9 and 13, generate an output signal $Vd$ in the form of a D-C voltage or a pulsating voltage, the value of which is proportional to the square root of the sum of the second powers of the velocities of movement of the carriage 5 and 6, that is, the recording velocity. More specifically, assuming that the velocities of movement of the carriage 5 and 6 are respectively represented by $Ux$ and $Uy$, the value of the output signal from the signal generator 16 is proportional to $v = \sqrt{Ux^2 + Uy^2}$ wherein $v$ represents the recording velocity attainable by the recording head 7 and, hence, the capillary nozzle 24 running over the paper sheet 4 during the recording operation.

The output signal from the signal generator 16 is fed to the recording head 7 to control voltage to be applied between the capillary nozzle 24 and a ring electrode 25 adjacent the nozzle 24 as will be described later so that liquid marking medium 28 contained in the reservoir 29 can be applied through the capillary nozzle 24 to the paper sheet 4 in an amount proportional to the recording velocity.

It will be understood from the foregoing that, as a result of the advantageous control by means of the voltage to be applied between the capillary nozzle 24 and the ring electrode 25, a line of uniform width and constant density can be drawn on the paper sheet 4 irrespective of the recording velocity.

The details of the signal generator 16 referred to above are best shown in FIG. 2 and reference is now made thereto. The signal generator 16 includes a pair of converters 17a and 17b respectively fed from the terminals X and Y. Assuming that output voltages applied to the terminals X and Y from the servo motors 9 and 13, respectively, to have individual values represented by E$x$ and E$y$, these converters 17a and 17b act to convert the voltages E$x$ and E$y$ so as to make these voltages E$x$ and E$y$ proprotional to the associated velocities U$x$ and U$y$ of movement of the carriages 5 and 6 and then to generate D-C voltages E$x'$ and E$y'$ that are proportional to said velocities U$x$ and U$y$. Output voltages E$x'$ and E$y'$ are respectively converted into A-C voltages by associated choppers 18a and 18b that are fed by a common square wave generator 19.

Outputs from the choppers 18a and 18b in the form of A-C voltages are subsequently applied to filters 20a and 20b, each of which acts to sample a sine wave of a predetermined frequency from the output from the chopper 18a or 18b. Sine wave voltages $ex$ and $ey$ emerging from the filters 20a and 20b, respectively, have peak A-C voltages substantially proportional to the D-C voltages E$x'$ and E$y'$.

It should be noted that the sine waves $ex$ and $ey$ are phase-synchronized with each other and, therefore, one or the other of these sine waves $ex$ and $ey$ should be displaced 90° in phase. For this purpose, a phase shifter 21 is utilized to advance or retard the phase of the sine wave $ey$ so that it is at a phase angle of 90° with respect to the phase of the other sine wave $ex$.

The sine wave voltages $ex$ and $ey'$, that are displaced 90° in phase with respect to each other, are in turn fed to an adder 22 which acts to add the sine wave voltages $ex$ and $ey'$. However, since the phases of the sine wave voltages $ex$ and $ey'$ are displaced as hereinbefore described, the adder 22 performs a vector addition of these voltages $ex$ and $ey'$ and, as a result thereof, generates an output voltage $e$ of a value substantially proportional to the recording velocity as hereinbefore described.

The output voltage $e$ from the adder 22 is subsequently converted by a converter 23 into a voltage signal, in the form of either a D-C voltage or a pulsating voltage, having a value suited as an input signal to the recording head 7.

As hereinbefore described, the recording head 7 accommodates therein the ink reservoir 29 having the capillary nozzle 24 in the form of a character delineating electrode downwardly extending from the bottom of said reservoir 29 towards the paper sheet 4.

The ring electrode 25 is arranged in a coaxially spaced relation to the capillary nozzle 24 so that, when voltage V is applied between the capillary nozzle 24 and the ring electrode, liquid marking medium 28 contained in the reservoir 29 can be drawn through the capillary nozzle 24 by the effect of electrostatic field established therebetween, travelling in the form of a fine jet through the ring electrode 25 onto the paper sheet 4.

The voltage V to be applied between the capillary nozzle 24 and the ring electrode 25 corresponds to the sum of the voltage V$_{DC}$ of a D-C bias power supply 26 and the value V$d'$ of the output voltage V$d$ of the converter 23 that has been amplified by an amplifier 27. Consequently, it is clear that an increase of the amplified voltage V$d'$ results in an increase of the amount of liquid marking medium jetted from the capillary nozzle 24 towards the paper sheet 4. It is also clear that, since the amplified voltage V$d'$ still remains proportional to the recording velocity, the line width of liquid marking medium thus deposited on the paper sheet 4 to represent, for example, a line, is constant irrespective of the recording velocity $v$.

In a form of the present invention which has been found to operate satisfactorily, the capillary nozzle 24 has an inner diameter of 0.2 mm and the ring electrode had an inner diameter of 4 mm and was spaced 3 mm. from the tip of the nozzle 24. The liquid marking medium employed was a water insoluble ink containing 100 parts of xylene, 10 parts of silicon resin (sold by Shinetsu Chemical Co. under an identification of KR214) and 5 parts of oil dye (C.I.26150), having a viscosity of 10 cp. at a temperature of 20°C. with surface tension of 28 dyne/cm.

With the foregoing particulars, it has been found that the relationship between the voltage V applied between the capillary nozzle 24 and the ring electrode 25 and the amount of the water insoluble ink of the above composition jetted from the nozzle 24 to the recording medium 4 followed a curve as represented by the correspondingly labelled line in the graph of FIG. 3. From the graph of FIG. 3, it is clear that, as the voltage V increases, that is, as the recording velocity $v$ increases, the amount of the water insoluble ink jetted increases. As regards the width and density of a line drawn on the recording medium 4 in the manner as hereinbefore described, it has been found that, when the recording medium was a film of polyester, the line width was 0.2 mm. at a recording velocity of 10 cm/sec and the line density was 2.3 in terms of the transmittance density of the line.

On the other hand, when the voltage V is fixed at 2.2 KV, a recording velocity $v$ of 5 cm/sec resulted in a line of 0.25 mm. in width and a velocity of 40 cm/sec resulted in a line of 0.12 mm. in width and, it is clear that, if the voltage V does not vary in response to variation of the recording velocity $v$, variation in the line width over the entire length thereof is considerable.

On the contrary, in the form of the present invention, when the voltage V was 1.8 KV and 2.5 KV at the respective times of continued recording at velocities of 5 cm/sec and 40 cm/sec, respectively, the slower recording velocity resulted in a line of 0.18 mm. in width and the higher one resulted in a line of 0.14 mm. in width and it is clear that, if the voltage V applied between the nozzle 24 and the ring electrode 25 is controlled so as to vary in proportion to the recording velocity $v$ such as according to the present invention, the degree of variation of the line width can be advantageously and considerably reduced as compared with the case where the voltage V is fixed throughout the recording operation.

When as a liquid marking medium a water soluble ink containing 65 parts of water, 20 parts of glycerol, 10 parts of methanol and 0.5 part of water soluble dye (C.I. 17916) was employed in place of the water insoluble ink, droplets of the water soluble ink each weighing approximately 0.07 $\mu$g were successively jetted from the capillary nozzle 24 in an amount of 1,650 per second at a voltage V of 2.1 KV and droplets each weighing approximately 0.12 μg were successively jetted from the same nozzle 24 in an amount of 1,800 per second at 2.3 KV. As a result, it has been found that, with the water soluble ink of the above composition, the successively jetted droplets of the ink did not form a continuous line as clear as did the water insoluble ink, but the degree of variation of the apparent line width was greatly reduced as compared with the case wherein the voltage V is fixed throughout the recording operation with the same water soluble ink.

The foregoing embodiment of the present invention is to be understood as characterized in that output signals from the servo motors 9 and 13 are converted into A-C voltages which are subsequently displaced 90° in phase with respect to each other and finally added by the adder to each other to give a voltage of a value corresponding to the recording velocity. Accordingly, so far as this can be achieved, the phase shifter 21 need not always inserted between the filter 20b or 20a and the adder 22, but may be inserted between the filter 20b or 20a and the chopper 18b or 18a. In addition, if the outputs from the servo motors 9 and 13 are both in the form of A-C voltage, the choppers 18a and 18b and filters 20a and 20b can be omitted.

Figures 4, 12, 13:
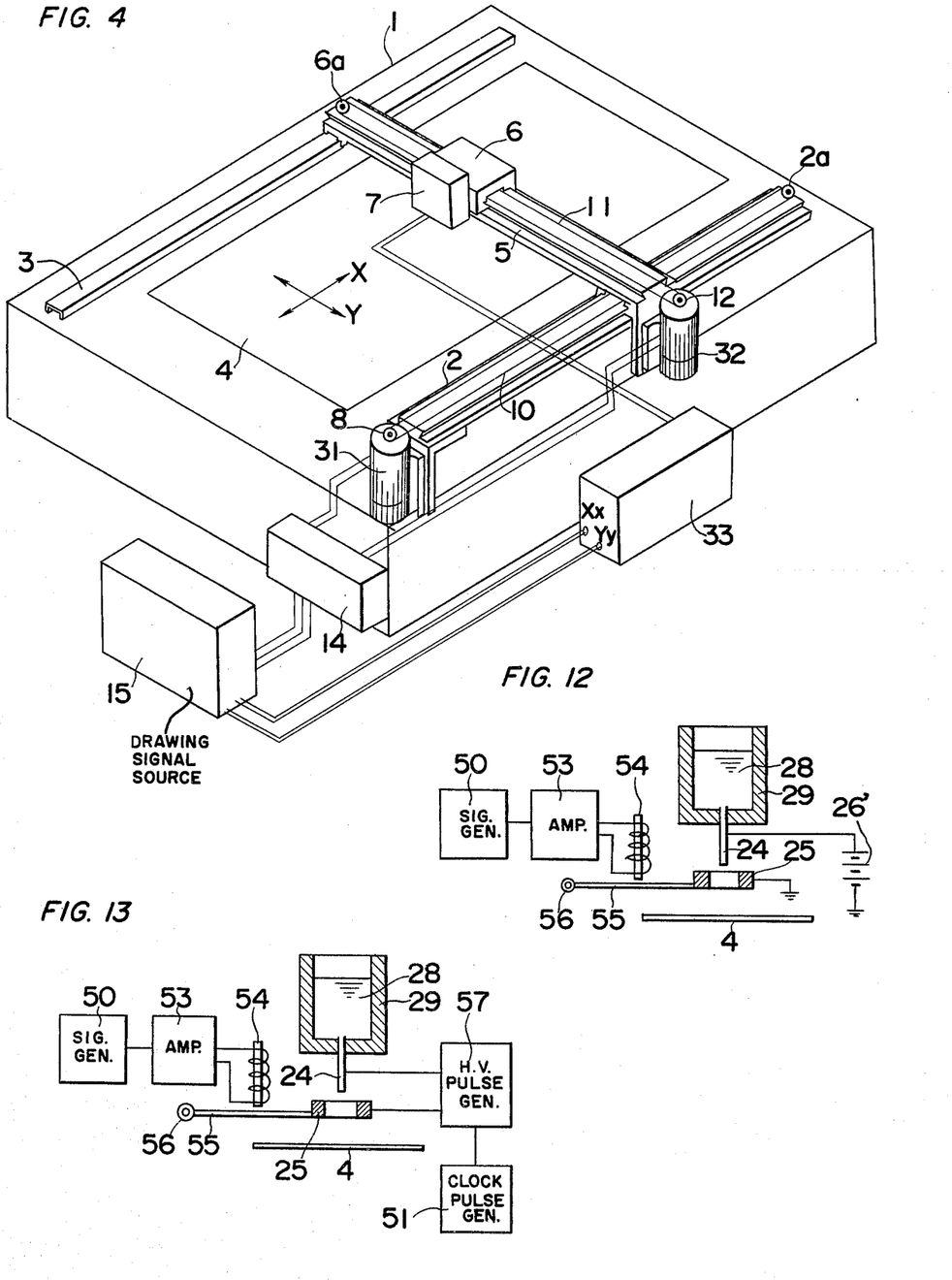

Referring now to FIG. 4, while the foregoing embodiment has been described as employing the servo motors 9 and 13 and the signal generator 16 in an arrangement as shown in FIG. 2, the embodiment shown in FIG. 4 employs pulse responsive motors or D-C servo motors 31 and 32 for moving the X-axis carriage 5 and Y-axis carriage 6, respectively. In view of the fact that the pulse responsive motors or D-C servo motors 31 and 32 are energized by instructions from the drawing signal source 15 that are fed thereto in the form of pulses, input terminals $Xx$ and $Yy$ of a signal generator 33 the details of which will be described later are fed from the drawing signal source 15 so as to respectively receive the same signals that are applied to the motors 31 and 32. The signal generator 33 employed in this embodiment acts in such a manner as to generate an output signal having a pulse frequency $f'$ which is proportional to $f = \sqrt{fx^2 + fy^2}$ wherein $fx$ and $fy$ represent the frequencies of pulses applied to the motors 31 and 32 and also to the terminals $Xx$ and $Yy$. More specifically, assuming that the distance of movement of the recording head 7 that takes place during the duration of one pulse is represented by $\delta$, the velocities $Ux$ and $Uy$ of movement of the carriages 5 and 6, respectively, are proportional to the individual numbers, that is, frequencies $fx$ and $fy$, of pulses applied to the associated motors 31 and 32 during a given period of time. On the other hand, since the recording velocity $v$ is represented by $\sqrt{Ux^2 + Uy^2}$, the following relation can be established.

$$v = \delta \sqrt{fx^2 + fy^2}$$

Figure 5:
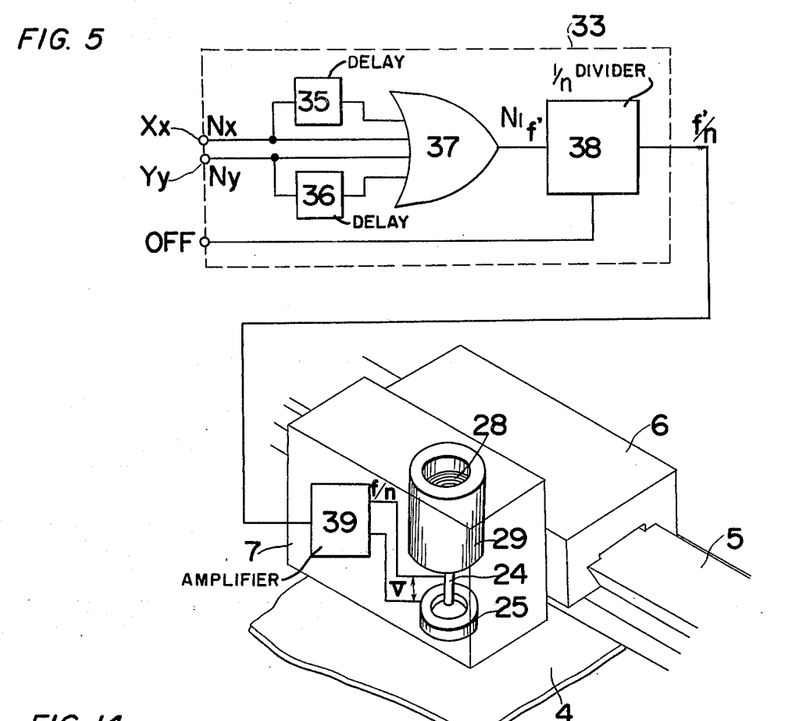
FIG. 5 is a block diagram an electrical circuit employed in the X-Y plotter of FIG. 4, FIGS. 6 to 9 illustrate various modifications of a signal generator employed in the circuit of FIG. 5, and FIGS. 10 to 21 illustrate various methods of applying a jet of liquid marking medium to a recording medium according to the present invention, which can be used in any of the embodiments of FIGS. 1 and 4.

The details of the signal generator 33 of the type referred to above are shown in FIG. 5 and particular reference will now be made thereto. Before the description proceeds, it is assumed that the pulses $Nx$ and $Ny$ applied to the respective terminals $Xx$ and $Yy$ are synchonized with respect to each other. In other words, the pulses $Nx$ and $Ny$ are assumed to be produced by the same clock pulse oscillator (not shown).

The pulses $Nx$ and $Ny$ applied to the respective terminals $Xx$ and $Yy$ are fed to an OR circuit 37. The OR circuit 37 has four input terminals, two of which are directly connected to the respective terminals $Xx$ and $Yy$ and the other two of which are connected to the terminals $Xx$ and $Yy$ through individual delay circuits 35 and 36.

The arrangement so far described is such that, if only the terminal $Xx$ receives a single pulse, the OR circuit 37 generates two pulses as its ouput and if the terminals $Xx$ and $Yy$ receive one pulse at the same time, the OR circuit 37 generates three pulses as its output.

The output from the OR circuit 37 is subsequently fed to a $1/n$ divider 38 wherein the pulse frequency of the output from the OR circuit is divided by $1/n$. This divider 38 may be a multi-stage circuit composed of flip-flops similar to a binary counter. In addition to the input terminal connected to the output of the OR circuit 37, the divider 38 has another input terminal OFF for receiving a reset signal which, when applied to said terminal OFF, acts to bring the divider 38 to an inoperative condition to thereby generate no output signal therefrom and, hence, to interrupt the supply of the liquid marking medium from the nozzle 24 towards the recording medium 4.

Assuming that the number of pulses $Nx$ applied per given period of time is 10 while that of pulse $Ny$ applied at the same time is within the range 0 to 10, the accurate distance D of movement of the recording head 7 is represented by $D = \delta N$ where $N = \sqrt{Nx^2 + Ny^2}$ and the following relations as set forth in Table 1 can be established. It should be noted that $N_1$ represents the number of pulses emerging from the OR circuit 37.

Table I

| Nx | Ny | N | $N_1$ | $N_1/2N$ |
|----|----|------|----|-------|
| 10 | 0  | 10.00 | 20 | 1.000 |
| 10 | 1  | 10.09 | 21 | 1.045 |
| 10 | 2  | 10.20 | 22 | 1.079 |
| 10 | 3  | 10.44 | 23 | 1.102 |
| 10 | 4  | 10.77 | 24 | 1.113 |
| 10 | 5  | 11.18 | 25 | 1.120 |
| 10 | 6  | 11.66 | 26 | 1.115 |
| 10 | 7  | 12.21 | 27 | 1.106 |
| 10 | 8  | 12.81 | 28 | 1.094 |
| 10 | 9  | 13.45 | 29 | 1.079 |
| 10 | 10 | 14.14 | 30 | 1.061 |

From the above table, it can be seen that the value of $N_1/2N$ falls within a tolerance of ±6 percent and, therefore, it can be said that the number of pulses $N_1$ produced by the circuit of FIG. 5 is substantially proportional to the value of D.

The pulse signal $f'/n$ emerging from the generator 33 is amplified by an amplifier 39 from which a pulse signal having a predetermined voltage and a predetermined pulse width can be produced. The amplified pulse signal is in turn applied between the nozzle 24 and the ring electrode 25 to establish the electrostatic field therebetween whereby liquid marking medium contained in the reservoir 29 can be drawn towards the recording medium 4 through the capillary nozzle 24.

In this arrangement, if the pulse signal to be applied between the nozzle 24 and the ring electrode 25 is adjusted so as to have a pulse width sufficient to draw a single droplet of liquid marking medium from the capillary nozzle 24, a series of plots of substantially uniform size can be formed on the recording medium 4 irrespective of the recording velocity due to the fact that the frequency of pulses applied to the nozzle 24 and the electrode 25 is in proportional relation to the recording velocity.

By way of example, with the foregoing arrangement of FIGS. 4 and 5, an experiment was conducted using ink, containing 90 parts of water, 10 parts of carbon black and 1 part of surface active agent, for the liquid marking medium. Application of a pulse signal having 2.2 KV pulse voltage and 0.45 milli-second pulse width, resulted in a jet of one droplet of the ink per duration of one pulse and ink droplets of substantially uniform size could be obtained within a pulse frequency range of from 10 to 1,500 Hz.

A similar experiment was also conducted with the use of water insoluble ink, containing 100 parts of anilline, 3 parts of silica and 0.5 part of oil dye (C.I.26150), for the liquid marking medium. Though the water insoluble ink of the above composition is effective to cause the nozzle to jet a continuous stream, not droplets, of the ink, application of a pulse signal having a 2.0 KV pulse voltage and a 0.25 milli-second pulse width, resulted in a droplet-like jet of the water soluble ink which can be regarded as one droplet and which responded within the range of from 2 to 1,000 Hz relative to the pulse frequency of the water insoluble ink used. The result was such that a line of substantially uniform width was drawn on the recording medium 4.

Figure 6:
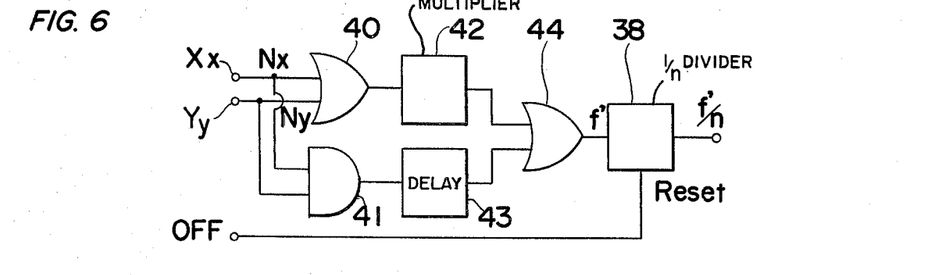
Figure 7:
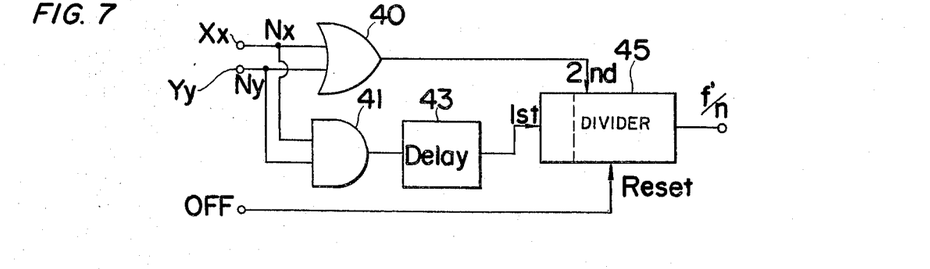

Assuming that the pulses applied to the respective terminals $Xx$ and $Yy$ of the signal generator 33 are synchronized with each other, a signal generator 33 which can be satisfactorily employed in the present invention can have an arrangement as shown in FIG. 6 and FIG. 7.

Referring to FIG. 6, the pulses $Nx$ and $Ny$ that have been applied to the terminals $Xx$ and $Yy$, respectively, are fed in part to an OR circuit 40 and in part to an AND circuit 41. Output from the OR circuit 40 is fed to a multiplier 42, by which said output from the OR circuit 40 is multiplied and in turn fed to an OR circuit 44. On the other hand, output from the AND circuit 41 is fed to a delay circuit 43 and in turn to the OR circuit 44 after having been delayed by the delay circuit 43 relative to the multiplied output from the multiplier 42. Output from the OR circuit 44 is subsequently divided by the divider 38 in a similar manner as in the arrangement of FIG. 5 so that a pulse signal having a frequency of $f'/n$ can be produced.

In the arrangement of FIG. 7, which does not utilize the multiplier 42 and OR circuit 44 that are required in the arrangement of FIG. 6, a divider 45 composed of flip-flops (not shown) is utilized wherein the first and second stages thereof are respectively connected to the outputs of the delay circuit 43 and OR circuit 40.

Either of these arrangements of FIGS. 6 and 7 functions satisfactorily in a similar manner as the signal generator of the arrangement of FIG. 5.

While the arrangements of FIGS. 5 to 7 can be effectively employed as a signal generator 33 only where the pulses $Nx$ and $Ny$ to be received thereby as inputs are synchronized with each other, if the signal generator 33 having an arrangement as shown in FIG. 5, FIG. 6 or FIG. 7 receives at its input terminals $Xx$ and $Yy$ pulses which are not synchronized with each other, it has been found that the plotter had an error of ±20 percent. Therefore, none of the arrangements of FIGS. 5 to 7 is not suited for a signal generator 33 which is usable in the X-Y plotter wherein pulses to be applied thereto are not synchronized with each other.

In order for the signal generator 33 to be usable in an X-Y plotter wherein pulses to be respectively applied to the terminals $Xx$ and $Yy$ thereof are not synchronized, it is possible to use means for synchronizing either of these pulses with the other, which means can be a gating circuit that generates synchronized pulses in response to the application of a clock pulse thereto. This synchronizing means may, if employed, be inserted between the drawing signal source 15 and the signal generator 33.

Figure 8:
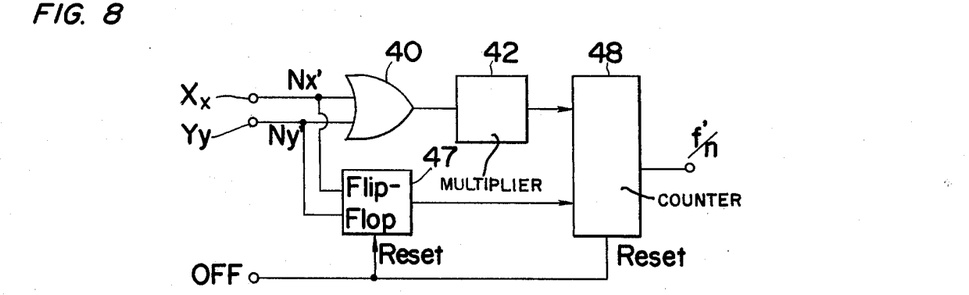
Figure 9:
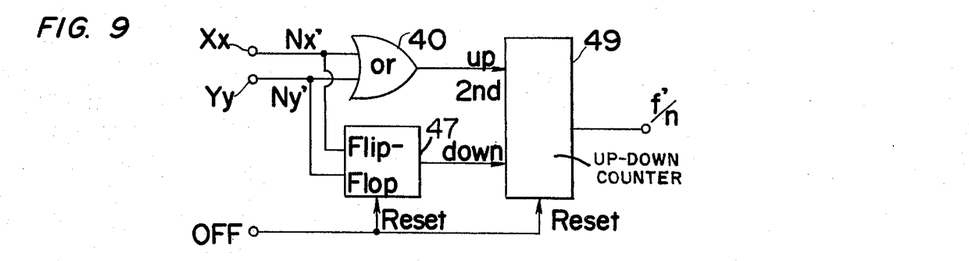

Another method for this purpose that does not require such synchronizing means as hereinbefore described is a modification of the arrangement of the signal generator 33 which is, for example, shown in FIGS. 8 and 9.

In the arrangement of FIG. 8, the pulses $Nx'$ and $Ny'$ which are not synchronized with each other and which have been applied to the respective terminals $Xx$ and $Yy$ are fed in part to the OR circuit 40 and in part to a flip-flop circuit 47. The multiplied output from the multiplier 42, which corresponds to the output from the OR circuit 40 that has been multiplied by the multiplier 42 is fed as an up-count signal to an up-down counter 48 on one hand, on the other hand, the flip-flop circuit 47 generates, only when repeated input of the pulses $Nx'$ and $Ny'$ is applied thereto, an output as a down-count signal to the up-down counter 48. The counter 48 functions as a divider or in a similar manner to a divider and is designed so as to generate an output $f'/n$ at the time the counter 48 completes its counting operation up to a suitable number of pulses.

The signal generator of the arrangement of FIG. 8 functions satisfactorily in a substantially similar manner to that shown in any of FIGS. 5 to 7.

The arrangement of FIG. 9 is similar to that of FIG. 8, but does not employ the multiplier 42. Instead thereof, the OR circuit 40 is directly connected to a second stage of an up-down counter 49. It should be noted that the output from the OR circuit 40 is applied as an up-count signal to the second stage of the up-down counter 49 while the other remains the same as in the arrangement of FIG. 8.

It should be noted that the divisor $n$ of the divider employed in the arrangements of FIGS. 5 to 7 and the preset value of pulse set in the up-down counter employed in the arrangements of FIGS. 8 and 9 are to be selected depending on the relationship between the frequency of the input pulses and that of the output pulses and may be a relatively small number in the case where the distance $\delta$ of movement of the recording head achieved per pulse is of a relatively great value. Preferably, one or both of the divider and up-down counter are of a type wherein the value $n$ and/or the preset value of pulses are adjustable as desired. By way of example, it has been found that, if $\delta = 0.01$ mm., it is preferred that the value of $n$ be within the range of from 10 to 20 in view of the fact that each droplet of the liquid marking medium to be jetted and deposited on the recording medium is required to have a size so as to form a plot of a diameter of approximately 0.2 mm.

Furthermore, any of the delay circuits shown in FIGS. 5 to 7 may have a delay time slightly greater than the pulse width of the input pulse and the delay time of any of the circuits shown in FIGS. 5 to 9 is mostly attributable to the divider or the up-down counter. However, in view of the fact that the delay characteristic of the divider of the up-down counter is a factor determined or selected depending on the performance characteristic of the recording head which utilizes the output signals, the delay does not represent a loss or unstable factor present in the signal generator and the amount of the delay time always corresponds to the duration of one pulse of the output signal even in the case where the recording velocity varies during the recording operation.

In the device described in the foregoing description, an error of ±6% has been found to occur. However, as can be understood from the foregoing description, the present invention should be understood as including various signal generator arrangements other than those shown in FIGS. 5 to 9 and described hereinbefore. By way of example, any of the arrangements shown in FIGS. 5 to 9 has been described as designed such that one pulse applied to either of the terminals $Xx$ and $Yy$ is converted into two pulses on one hand and, on the other hand, where the terminals $Xx$ and $Yy$ receive two pulses, respectively, at the same time, three pulses are generated from the signal generator. However, in order to reduce the error, for example, to ±3%, an arrangement of the signal generator may be such that, if only one of the terminals $Xx$ and $Yy$ receives a pulse, this single pulse is converted into three pulses the one hand and, if the both terminals $Xx$ and $Yy$ receive two pulses, respectively, at the same time, they be converted into four pulses.

In a similar way, the signal generator may be designed to operate in such a manner as to extrapolate from the graph available on the basis of the foregoing table. This is possible by providing means for, upon detection of a ratio between the pulse frequencies that have been applied to the related terminals $Xx$ and $Yy$, an detecting where the ratio is located in the graph.

In any event, a characteristic feature of any of the signal generator arrangements of FIGS. 5 to 9 according to the present invention resides in that the signal generator generates a pulse signal of a pulse frequency substantially proportional to $\sqrt{Nx^2 + Ny^2}$ and the delay time inherent in the circuit of the signal generator is made as small as possible during the operation thereof. There are other signal generator arrangements that satisfy the foregoing requirement and those should be understood as being included within the scope of the present invention.

Moreover, the signal generator of any of the foregoing arrangements shown in FIGS. 5 to 9 can function not only to convert digital input into analog output, but also to convert analog input into digital output, by the use of a pulse frequency-voltage converter.

The details of the recording head 7 will now be described with reference to FIGS. 10 to 21. However, in the following description, it should be noted that reference numeral 50 represents the signal generator 16 of the arrangement of FIG. 2 or the signal generator 33 of any of the arrangements shown in FIGS. 5 to 9.

Figure 10:
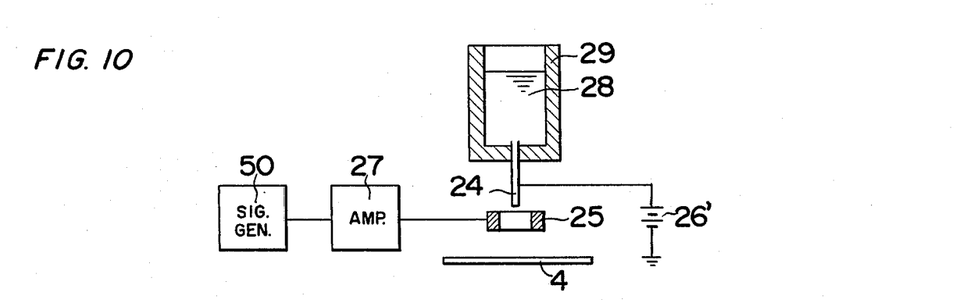

Referring first to FIG. 10, although the arrangement shown is similar to that shown in FIG. 2, the D-C bias power supply 26 is replaced by a D-C high voltage power supply 26' which is connected to the capillary nozzle 24. The electrode 25 is adapted to receive the output signal from the signal generator 50 through the amplifier 27.

It will be seen that, when the output signal from the signal generator 50 which has a voltage proportional to the recording velocity is applied to the nozzle 24, the liquid marking medium 28 within the reservoir 29 can be jetted from the capillary nozzle 24 in an amount proportional to the voltage of the output signal thus applied and, consequently, a line of uniform width and constant density can be drawn on the recording medium irrespective of the recording velocity.

Figure 11:
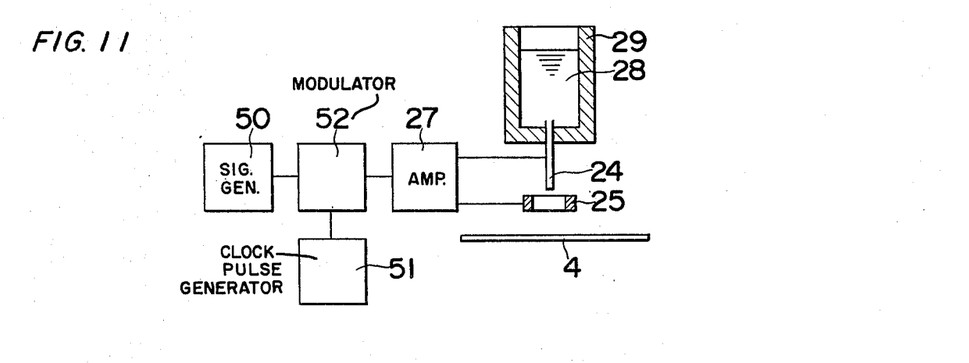

Shown in FIG. 11 is a recording head wherein a voltage to be applied between the capillary nozzle 24 and the ring electrode 25 is in the form of a pulse. To this end, the output signal from the signal generator 50 is modulated to vary the pulse voltages by a clock pulse generator 51 and a modulator 52, and is in turn fed to the amplifier 27 to generate a high voltage pulse. When this high voltage pulse is applied between the nozzle 24 and the ring electrode 25, the amount of each of a series of droplets jetted from the nozzle 24 can be varied. In this case, it is not always necessary to attain 100 percent modulation of the pulse, but the D-C voltage and the pulse voltage may be superimposed on each other.

In the recording head of any of the arrangements of FIGS. 2, 10 and 11, it is generally preferred that the D-C bias voltage and the voltage to be modulated respectively be within the range of 1 to 2 KV and within the range of 200 to 1,500 V and it has been found that, in the case where the pulse voltage is applied between the nozzle 24 and the ring electrode 25, the pulse voltage to be applied is required to be higher than the optimum D-C voltage by 10 percent. It has also been found that a pulse width lower than 1 milli-second is sufficient.

Current flowing between the nozzle 24 and the ring electrode 25 was within the range of 0.1 to 5 $\mu$A in the case where water soluble ink was used for the liquid marking medium and within the range of 10 to 100 nA in the case where water insoluble ink was used for the liquid marking medium. The load imposed on the power source was negligible and, though it has been found that the polarity of voltage to be applied between the nozzle 24 and the electrode 25 should be selected depending on the type of the liquid marking medium used, application of a positive voltage to the nozzle 24 is preferred so that a stabilized control of the amount of the liquid marking medium to be jetted is attained.

The arrangement of the recording head shown in FIG. 12 is such that, without the voltage applied between the nozzle 24 and the electrode 25 being varied, the relative distance between the nozzle 24 and the electrode 25 is made to vary. For this purpose, an arm 55 is employed which has the ring electrode 25 rigidly mounted on one end and has the other end pivotally connected as at 56 to, for example, a housing structure of the recording head 7. Situated immediately above the arm 55 and along of the length of said arm 55 is a solenoid 54 electrically connected to an amplifier 53 which is fed from the signal generator 50. It should be noted that voltage to be applied between the nozzle 24 and the electrode 25 is available from the D-C power source 26', which voltage has a fixed value. Control of the amount of liquid marking medium to be jetted from the nozzle 24 onto the recording medium 4 can be carried out by pivoting the arm 55 about the pivot 56 so as to adjust the relative distance between the nozzle 24 and the electrode 25 on the arm 55. This is possible by energizing or deenergizing the solenoid in response to the output signal fed from the signal generator 50 through the amplifier 53.

In the foregoing arrangement, although the ring electrode 25 carried by the arm 55 moves in a substantially curved path as the arm 55 pivots about the pivot 56, the angular distance through which the electrode 25 actually moves is approximately 1 mm. and therefore, there is substantially no adverse influence on the control of the jet of liquid marking medium.

A modification of the arrangement of FIG. 12 is shown in FIG. 13, wherein the voltage to be applied between the nozzle 24 and the ring electrode 25 is in the form of a pulse which is generated by a high voltage pulse generator 57 and a clock pulse generator 51. In this arrangement of FIG. 13, the relationship between the nozzle-to-electrode distance and the amount of liquid marking medium jetted was such that increase of the distance between the nozzle 24 and the electrode 25 corresponded to an increase of the minimum voltage to be applied therebetween which is required to initiate the jet from the nozzle 24. By way of example, when the nozzle-to-electrode distance was 2 mm., a voltage of 2.1 KV was required to initiate the jet and, and when it was 3.5 mm., a voltage of 2.4 KV was required for the same purpose. In other words, when the nozzle-to-electrode distance was varied in accordance with the recording velocity then prevailing while the voltage of the power source 26' was set to be the minimum value required when the nozzle-to-electrode distance would have been the maximum value, variation of the width of the resultant line could be greatly reduced as compared with the case wherein the nozzle-to-electrode distance was not able to be varied.

Figures 14, 15:
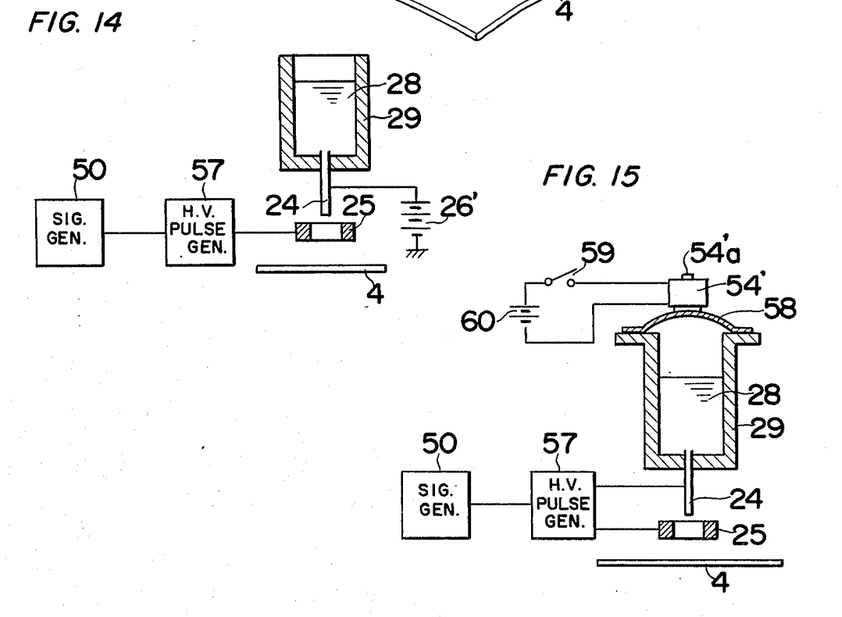

In FIG. 14, wherein another modification of the arrangement of FIG. 5 is shown, D-C voltage is applied to the nozzle 24 from the D-C power source 26'. The output signal from the signal generator 50 which is proportional both to the recording velocity and to the pulse frequency is fed to the high voltage pulse generator 57, the high voltage pulse emerging from said generator 57 being in turn applied to the ring electrode 25. In this arrangement of FIG. 14, if the voltage of the D-C power source 26' is selected so as to be within the range of 1 to 2 KV which is insufficient to produce a flow of liquid marking medium out of the nozzle 24 while the voltage of the high voltage pulse to be applied to the ring electrode 25 is selected within the range of $-500$ to $-1.5$ KV, a series of droplets of the liquid marking medium can be jetted from the nozzle 24 in response to pulse input and deposits of these droplets are, as a result thereof, formed on the recording medium 4 in a row at uniform intervals irrespective of the recording velocity. An advantage of the arrangement of FIG. 14 is that the pulse voltage may be lower than that employed in the arrangement of FIG. 5.

The arrangement shown in FIG. 15 is similar to that shown in FIG. 14, but the reservoir 29 shown in FIG. 15 is provided with a diaphragm lid 58 closing the opening of said reservoir 29. A solenoid 54' having a solenoid armature 54'a connected with the diaphragm lid 58 is electrically connected to a power source 60 through a switch 59.

In the arrangement of FIG. 15, each time the switch 59 is closed to energize the solenoid 54', the diaphragm lid 58 is depressed inwardly of the reservoir 29 thereby to increase the meniscus at the tip of the nozzle 24 which is expelled in the form of a droplet towards the recording medium 4 by the application of the pulse frequency modulated signal between the nozzle 24 and the ring electrode 25.

In the event that the switch 59 is designed so as to be turned on and off in response to start and stop of the recording operation of the plotter, respectively, jetting of liquid marking medium can be correspondingly initiated and interrupted irrespective of the application of the pulse frequency signal between the nozzle 24 and the ring electrode 25 and, in addition thereto, deposits of the droplets of the liquid marking medium can be formed on the recording medium 4 in a row at substantially uniform intervals. The pressure required to operate in this manner is 10 to 50 mmH$_2$O in terms of hydrostatic pressure and therefore a relatively low power suffices.

In the arrangement of FIG. 15, if a signal for detecting the hydrostatic pressure is provided, the hydrostatic pressure to be applied to the liquid marking medium within the reservoir 29 can be varied thereby to vary the size of each droplet jetted from the nozzle 24 so that the width and density of the resultant deposits can be adjusted as desired and irrespective of the recording velocity. Moreover, if the switch 59 is repeatedly turned on and off, a row of dots or chain lines will be formed on the recording medium 4.

Figure 16:
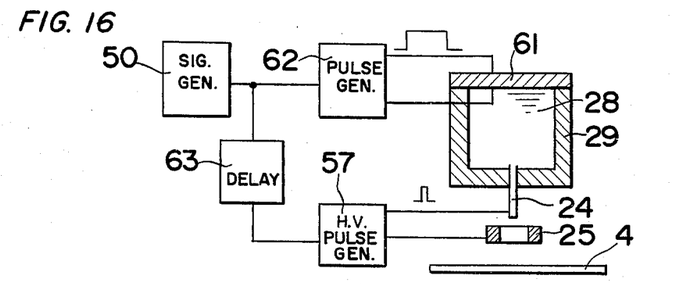

FIG. 16 illustrates a recording head arrangement which utilizes both voltage pulse and pulsating pressure for controlling the amount of liquid in the jet. In this arrangement, the output signal from the signal generator 50 in the form having pulse of a frequency proportional to the recording velocity is in part applied to a pulse generator 62 to cause the latter to generate pulses which are applied to an electroacoustic converter 61 and in part to a high voltage pulse generator 57 through a delay circuit 63.

The electroacoustic converter 61 is mounted on the upper open end of the reservoir 29 and operates upon receipt of the output signal from the signal generator 50 in such a manner as to apply a pulsating pressure to the liquid marking medium 28 within the reservoir 29 thereby to readily form a convex meniscus of the liquid marking medium at the tip of the nozzle 24. On the other hand, when the output signal from the signal generator 50 is received by the high voltage pulse generator 57 after having been delayed by the delay circuit 63, a high voltage pulse is supplied from the generator 57 to both the nozzle 24 and the ring electrode 25 thereby permitting each droplet of the liquid marking medium to be expelled towards the recording medium 4.

In the arrangement of FIG. 16, the pulsating pulse generated by the electroacoustic converter 61 facilitates formation of the convex meniscus at the tip of the nozzle 24 so that the jet of droplets of the liquid marking medium can be provided with a substantially improved response characteristic relative to the application of the high voltage pulse between the nozzle 24 and the electrode 25. In addition, by adjusting the pulsating pressure, the size of the convex meniscus at the tip of the nozzle 24 can be selected as desired so that a substantial line of desired width, which is represented by a series of overlapping deposits of the liquid marking medium, can be drawn on the recording medium 4.

It has been found that the size of the convex meniscus at the nozzle tip is closely related to the pulse width of the high voltage pulse employed. For example, a high voltage pulse having more than a 10 milli-second pulse width was required to form a convex meniscus of water soluble ink having a size smaller than one third of the inner diameter of the nozzle 24 and a 0.6 milli-second pulse width was required to form a convex meniscus of the same water soluble ink having a size corresponding to two thirds of the inner diameter of the nozzle 24. It should be noted that the required pulse width of the high voltage pulse was considerably reduced with reduction of the size of the convex meniscus of the water soluble ink to a value below half the inner diameter of the nozzle 24. However, it was difficult to maintain the convex meniscus at the nozzle tip throughout the operation and, at substantial intervals of 10 seconds, the liquid marking medium flowed in the form of drops out of the nozzle 24.

In order to avoid this defect, application of the pulsating pressure to the liquid marking medium 28 within the reservoir 29 to form the convex meniscus at the nozzle tip should be carried out prior to application of the voltage pulse between the nozzle 24 and the electrode 25 so that substantially no arbitrary flow of drops of the liquid marking medium out of the nozzle 24 will occur. In any event, it has been found that the pulsating pressure need not always have a perfect waveform and it is sufficient if the value thereof is within the range of 10 to 50 mmH$_2$O in terms of hydrostatic pressure. It has also been found that, by varying the value of either the pulsating pressure or the high voltage pulse, the size of each of the droplets can be varied and, accordingly, the same device can be used in drawing lines of different width.

The recording head arrangement of FIG. 16 will now be illustrated by way of example.

According to an experiment conducted wherein the liquid marking medium employed was water soluble ink containing water and glycerin, which was placed in the reservoir 29 having a capillary nozzle with an inner diameter of 0.2 mm, and the applied voltage was a fixed value of 2.2 KV, the amount of the water soluble ink jetted was 0.075 mg/sec. at a hydrostatic pressure of 23 mm., 0.15 mg/sec. at a hydrostatic pressure of 30 mm., and 0.35 mg/sec. at a hydrostatic pressure of 40 mm. Thus, it has been found that, by suitably selecting the hydrostatic pressure, the width of the resultant line can be controlled as desired. It has also been found that, although an increase in the inner diameter of the nozzle resulted in an increase of the amount of the water soluble ink jetted proportional to a value corresponding to the third power of the inner diameter of the nozzle 24, variation of the amount of the water soluble ink jetted relative to the hydrostatic pressure was as great as the variation of the amount of the water soluble ink jetted relative to the nozzle 24 having a relatively small inner diameter. By way of example, when the nozzle 24 having an inner diameter of 0.35 mm was used, the amount of the water soluble ink jetted was 0.23 mg/sec. at a hydrostatic pressure of 23 mm. and 0.92 mg/sec. at a hydrostatic pressure of 34 mm.

Figure 17:
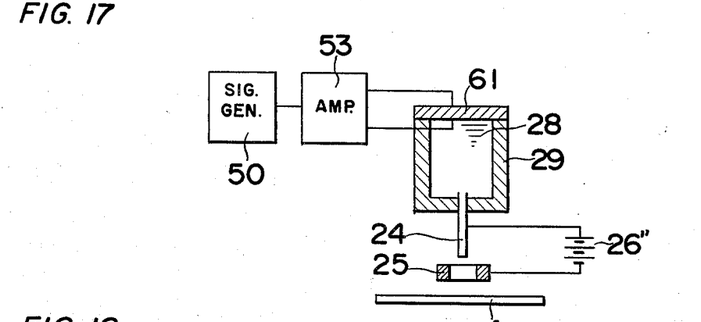

FIG. 17 illustrates a recording head arrangement wherein the control of the amount of liquid marking medium to be jetted is carried out by a pulsating pressure having a value substantially proportional to the recording velocity. In this arrangement, the output signal from the signal generator 50 is applied to the electroacoustic converter 61 through the amplifier 53, thereby causing the electroacoustic converter 61 to generate a pulsating pressure on the liquid marking medium 28 contained within the reservoir 29 and, therefore, a convex meniscus of the liquid marking medium can be formed at the nozzle tip in a manner substantially similar to that of the recording head arrangement of FIG. 16. On the other hand, the voltage necessary to expel the liquid marking medium from the nozzle 24 towards the recording medium 4 is supplied from the D-C power source 26''.

It will be seen that, since the value of the signal to be applied to the electroacoustic converter 61 is in proportional relation to the recording velocity, the value of the pulsating pressure, that is, the size of the resultant convex meniscus at the nozzle tip, is therefore proportional to the recording velocity. Accordingly, jetted droplets of the liquid marking medium from the nozzle 24 depicts a line of substantially constant width irrespective of the recording velocity.

Figure 18:
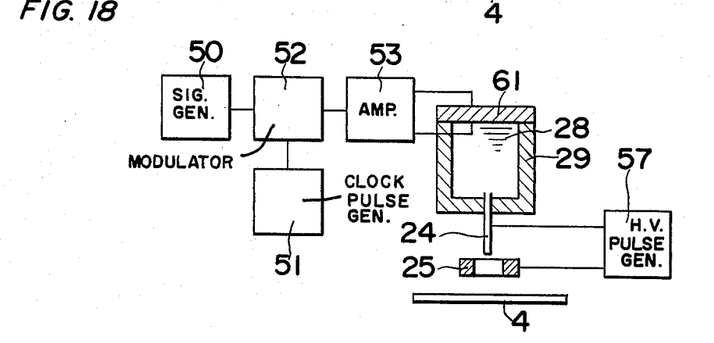

The arrangement shown in FIG. 18 is substantially similar to that of FIG. 17, but is designed so that the output signal from the signal generator 50 is applied to the modulator 52 before it is applied to the electroacoustic converter 61. The modulator 52 acts in cooperation with the clock pulse generator 51 to generate a pulse having a value proportional to the recording velocity, which is in turn applied to the electroacoustic converter 61 through the amplifier 53 so that a convex meniscus of the liquid marking medium having a size proportional to the recording velocity can be formed at the nozzle tip. On the other hand, voltage necessary to expel the liquid marking medium from the nozzle 24 towards the recording medium 4 is a D-C or pulse voltage generated from the high voltage power source 57.

The recording head arrangement of FIG. 18 is such that, when the voltage from the power source 57 is applied between the nozzle 24 and the electrode 25, each convex meniscus at the nozzle tip, the size of which has been made proportional to the recording velocity, can be expelled from the nozzle 24 towards the recording medium 4 so that a line of substantially constant width irrespective of the recording velocity can be drawn on the recording medium 4.

Figure 19:
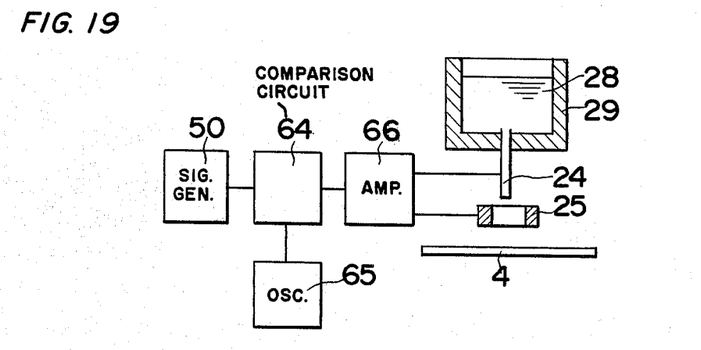

The recording head arrangement shown in FIG. 19 is such that the output signal from the signal generator 50 is converted into a pulse having a pulse width substantially proportional to the recording velocity. More specifically, the output signal having a value proportional to the recording velocity, which is generated from the signal generator 50, is fed to a comparision circuit 64 which operates in cooperation with a sawtooth wave oscillator 65 to generate a voltage pulse having a pulse width proportional to the recording velocity. The voltage pulse emerging from the comparision circuit 64 is in turn applied between the electrode 25 and the nozzle 24 through an amplifier 66 whereby liquid marking medium 28 can be jetted in an amount proportional to the recording velocity which is in turn deposited on the recording medium 4 to form a line of substantially constant width irrespective of the recording velocity.

In this recording head arrangement of FIG. 19, the voltage to be applied between the nozzle 24 and the ring electrode 25 is preferably within the range of 1.5 to 3.0 KV.

Figure 20:
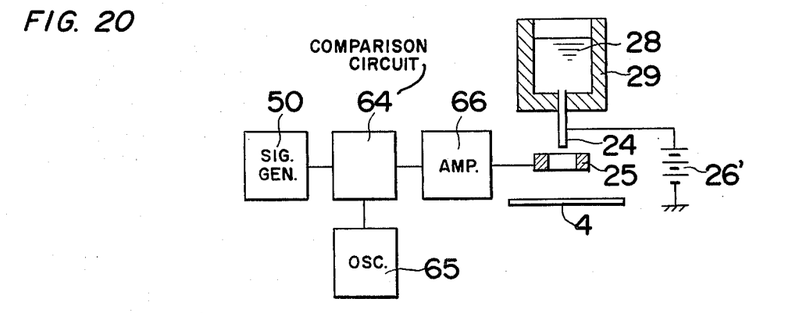

FIG. 20 illustrates a recording head arrangement wherein a high voltage pulse which has a pulse width proportional to the recording velocity and which has emerged from the comparision circuit 64 through the amplifier 66 is applied only to the ring electrode 25 while the nozzle 24 is adapted to receive voltage from the D-C power source 26'. Even this recording head arrangement functions satisfactorily in a substantially similar manner to that shown in FIG. 19, but the value of the high voltage applied to the ring electrode 25 is advantageously lower than that required in the arrangement of FIG. 19, for example, within the range of 0.5 to 1.5 KV.

In either of the recording head arrangements of FIGS. 19 and 20, when water soluble ink was used for the liquid marking medium, it was found that the number of droplets jetted from the nozzle 24 per second was 500 to 3,000 and, therefore, if the pulse width is modulated, the control of the amount of liquid marking medium can be carried out in a stepwise manner the same as if the number of pulses was modulated for the ink employed. In other words, in the recording head arrangement wherein droplets of the liquid marking medium in an amount of 1,000 per second can be produced upon application of a D-C voltage, a pulse width of less than 0.5 milli-second is not sufficient to produce droplet at a nozzle tip and a pulse width of 0.5 to 1.5 milli-second and 1.5 to 2.5 milli-seconds is required to produce one droplet and two droplets, respectively.

On the other hand, in the case where the water insoluble ink was used for the liquid marking medium, since the ink has the a property of forming a threadlike jet, it can be jetted in an amount corresponding to the pulse width. However, there may be a minimum value of the pulse width required to jet the liquid marking medium from the nozzle 24 onto the recording medium 4, and a pulse width less than 0.2 milli-second has been found insufficient to produce the jet if the liquid marking medium is prepared as described in Example I. It is, however, to be noted that if the ink is of a type having a thixotropic characteristic, the minimum pulse width of the pulse to be applied can be reduced.

In any event, all of the recording head arrangements hereinbefore fully described should satisfy the following requirements.

Inner Diameter of the Nozzle 24:
Within the range of 0.1 to 1.0 mm.

If the inner diameter of the nozzle 24 is smaller than this lower limit, manufacture thereof will become difficult and, even if it is successfully manufactured, the resultant nozzle will not function in a substantially stable manner. On the other hand if the same is greater than this upper limit, a force sufficient to produce the jet of ink by the application of voltage cannot be provided.

Length of the Nozzle 24:
Within the range of 1 to 30 mm.

Depending on the shape of the nozzle 24, the a length smaller than the lower limit can be satisfactorily employed. However, the use of the nozzle shorter in length than the lower limit cannot be recommended because of difficulty in mounting such a nozzle on the reservoir 29 and because of the lack of mechanical stability. If the nozzle 24 is greater in length than the upper limit, a sufficient mechanical strength cannot be given to the nozzle 24 due to the fact that the latter is usually thin. It is particularly to be noted that, although the necessary hydrostatic pressure is determined by the surface tension of ink to be employed and the inner diameter of the nozzle 24, a nozzle of approximately 0.2 mm. inner diameter is, if subjected to a hydrostatic pressure not more than 50 mmH$_2$O, sufficient to prevent the flow of ink out of the nozzle and, therefore, the length of the nozzle 24 depends on this hydrostatic pressure.

Wall Thickness of the Nozzle 24:
The thickness of a cylindrical wall forming the nozzle 24 should be as small as possible to achieve stabilized control of the amount of liquid marking medium to be jetted.

Nozzle-to-Electrode Distance:
The distance between the nozzle 24 and the ring electrode 25 should be within the range of 1 to 10 mm.

Although a jet of liquid marking medium from the nozzle 24 can be formed even if this distance is greater than the upper limit, there is a defect in that the voltage to be applied therebetween correspondingly increases. On the other hand, if the distance is smaller than the lower limit, a spark will occur therebetween.

Inner Diameter of the Electrode 25:
Within the range of 2 to 10 mm.

Comments on the nozzle-to-electrode distance described above apply here as well.

Distance Between the Nozzle 24 and the Recording Medium 4:
Within the range of 1 to 50 mm.

If this distance is lower than the smallest limit, the tip of the nozzle 24 will contact the recording medium if the latter has a rough surface, to an extent that drawing or recording cannot be performed. On the other hand, if this distance is greater than the upper limit the jet of liquid marking medium expelled will sway and a relatively great time will be required for the liquid marking medium to arrive at the recording medium. Usually, the jet travels at 3 to 30 m/sec.

Viscosity of the Liquid Marking Medium:
Lower than 50 cp.

Increase in the viscosity of the liquid marking medium beyond this limit results not only in a reduction in the amount thereof jetted, but also in a reduction in the line density which occurs particularly in a relatively thin line when such a line is drawn. However, liquid material such as glycerin having a viscosity of 1,500 cp. can be satisfactorily jetted by the recording head according to the present invention.

Surface Tension of the Liquid Marking Medium:
Lower than 50 dynes/cm.

Although it depends on the machining of the nozzle 24, water having a surface tension of 78 dynes/cm. can be satisfactorily jetted, although the jet of such water will not be stable.

Without voltage being applied between the nozzle 24 and the ring electrode 25, that is, without employing the ring electrode 25 and associated circuits required to generate such voltage, a jet of liquid marking medium can be produced. A recording head arrangement achieving this purpose is illustrated in FIG. 21.

Figure 21:
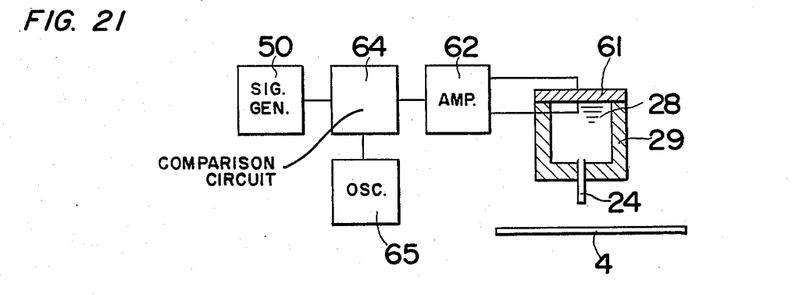

Referring now to FIG. 21, the output signal from the signal generator 50 is first applied to the comparison circuit 64 which cooperates with the sawtooth wave oscillator 65 for converting the output signal into a pulse signal having a pulse width proportional to the recording velocity. The pulse signal from the comparison circuit 64 is in turn applied through an amplifier 62 to the electroacoustic converter 61 which than applies a pulsating pressure to the liquid marking medium 28 contained in the reservoir 29. The nozzle 24 employed in this head arrangement is preferably smaller than 0.1 mm. in inner diameter. In addition, it has been found that the pulsating pressure applied to the liquid marking medium 28 within the reservoir 29 is required to be more than 10 kg/cm$^2$ which is substantially greater than 1,000 times the hydrostatic pressure that is required in the arrangement wherein the jet is formed by the application of electrical voltage.

Even the recording head arrangement of FIG. 21 functions in a manner which causes the amount of the liquid marking medium to be jetted to be proportional to the pulse width and, therefore, a line of uniform width can be drawn irrespective of the recording velocity on the recording medium.

The recording medium 4 which can be employed in the present invention can be a sheet of paper, cloth, synthetic film, metal or any other character receiving surfaces, which may have a surface which is rough or smooth. In addition, the distance between the tip of the nozzle 24 and the recording medium 4 is preferably as small as possible since the smaller this distance, the less the jet of liquid marking medium flowing between the nozzle 24 and the recording medium 4 sways under the influence of air flowing around the jet. However, the distance between the nozzle 24 and the recording medium 4 is preferably approximately 5 mm.

The liquid marking medium which can be employed in the present invention can be a water soluble ink which will form a series of droplets or such a water insoluble ink which will form a continuous, thread-like stream. In view of this, where water insoluble ink is employed for the liquid marking medium, the word "droplet" should be construed as an amount of ink jetted in proportion to the pulse width. Furthermore, the use of the water insoluble ink having a viscosity of lower than 5 cp. requires a pulse width of approximately 0.3 milli-second in order that it can be satisfactorily jetted.

Moreover, the liquid marking medium which can be employed in the present invention includes ink which is capable of being melted or capable of having its viscosity reduced under the influence of heat at a substantially elevated temperature and an ink which is capable of being colored in contact with the recording medium though not containing any coloring agent in itself.

Water insoluble ink is advantageously employed in high speed recording or drawing due to the fact that the water insoluble ink if jetted travels at some dozens of meters per second to some tens meter per second without a time lag in responding to the applied signal.

From the foregoing full description of the present invention, it has now become clear that the X-Y plotter constructed according to the present invention operates in such a way as to record or draw a line of uniform width and density substantially uninfluenced by the surface condition of the recording medium employed and irrespective of the actual recording velocity. This is possible because the amount of the liquid marking medium jetted is controlled in response to the recording velocity.

Furthermore, where the jetting of the liquid marking medium is intermittently carried out, broken or chain lines can be recorded or drawn on the recording medium without the necessity for ink recovery such as has been necessary in the prior art.

Although the present invention has been fully described by way of example, it should be noted that various changes and modifications will be apparent to those skilled in the art and, therefore, unless otherwise they depart from the true scope of the present invention, they should be construed as included therein.

What I claim is:

1. A non-impact, liquid jet recording apparatus for use in an X-Y plotter of a type which comprises a support table adapted to support a recording medium thereon, an X-axis carriage mounted for parallel movement across said support table in the direction of the X-ordinate, a Y-axis carriage mounted on said X-axis carriage for movement in the direction of the Y-ordinate, a first drive unit for moving said X-axis carriage and a second drive unit for moving said Y-axis carriage, said apparatus comprising:

a recording head rigidly carried by said Y-axis carriage and including a nozzle through which a liquid marking medium is jetted onto the recording medium, means for supplying said liquid marking medium to the exit of said nozzle, and an electrode member spaced from the exit of said nozzle and situated above said recording medium;

electrical means coupled to said electrode and said nozzle for applying a potential between said nozzle and said electrode member for establishing therebetween an electrostatic field required to attract said liquid marking medium from the exit of said nozzle; and circuit means for controlling said electrical means to cause said electrical means to operate in such a manner as to jet said liquid marking medium in a varying amount substantially proportional to the recording velocity which is defined by the square root of the sum of the second powers of the velocities of movement of said carriages.

2. An apparatus as defined in claim 1 wherein said electrical means applies a potential which is a D-C voltage.

3. An apparatus as claimed in claim 1 wherein said electrical means applies a potential which is a pulsating voltage.

4. An apparatus as defined in claim 1 wherein said apparatus further comprises means for applying pulsating pressure to the supply of the liquid marking medium.

5. An apparatus as claimed in claim 4 in which said pulsating pressure applying means applies pulses with a pulse width corresponding to the recording velocity.

6. An apparatus as claimed in claim 4 in which said pulsating pressure applying means applies pulses with a pulse frequency corresponding to the recording velocity.

7. An apparatus as defined in claim 1 wherein said circuit means comprises a signal generator which, upon receipt of a first signal indicative of the velocity of movement of said X-axis carriage fed from said first drive unit, and a second signal indicative of the velocity of movement of said Y-axis carriage fed from said second drive unit, generates an electrical output indicative of the recording velocity.

8. An apparatus as defined in claim 7 wherein said first and second signals are pulses, respectively, the individual frequencies of which represent the associated velocities of movement of said carriages.

9. A non-impact, liquid jet recording apparatus for use in an X-Y plotter of a type which comprises a support table adapted to support a recording medium thereon, an X-axis carriage mounted for parallel movement across said support table in the direction of the X-ordinate, a Y-axis carriage mounted on said X-axis carriage for movement in the direction of the Y-ordinate, a first drive unit for moving said X-axis carriage and a second drive unit for moving said Y-axis carriage, said apparatus comprising:

a recording head rigidly carried by said Y-axis carriage and including a nozzle through which a liquid marking medium is jetted onto the recording medium, means for supplying said liquid marking medium at the exit of said nozzle, and an electrode member spaced from the exit of said nozzle and situated above said recording medium;

potential applying means for applying a potential between said nozzle and said electrode member for establishing therebetween an electrostatic field required to attract said liquid marking medium from the exit of said nozzle towards said recording medium;

circuit means operable upon receipt of first and second signals which are respectively fed from said first and second drive units representing the individual velocities of movement of said carriages to generate a control signal utilizable to control said potential applying means to cause said control signal to operate in such a manner as to jet said liquid marking medium in a varying amount substantially proportional to the recording velocity which is defined by the square root of the sum of the second powers of the velocities of movement of said carriages.

10. An apparatus as claimed in claim 9 wherein said velocities of movement of said carriages are respectively represented by the voltages of said first and second signals and wherein said circuit means comprise a signal generator including first and second conversion means for converting said first and second signals into A-C voltages, respectively, a phase shifter for displacing the phase of the A-C voltage fed from either of said first and second conversion means at right angles with respect to the phase of the A-C voltage fed from the other conversion means and an adder operable upon receipt of said A-C voltages displaced in phase relative to each other to generate an output signal indicative of the recording velocity, said output signal being the control signal.

11. An apparatus as defined in claim 10 wherein said adder generates a D.C. voltage output signal.

12. An apparatus as defined in claim 9 wherein said potential applying means applies a D.C. voltage between said nozzle and said electrode member.

13. An apparatus as defined in claim 9 wherein said potential applying means applies a pulsating voltage between said nozzle and said electrode member.

14. An apparatus as defined in claim 9 wherein said potential applying means applies a high voltage pulse having a frequency substantially proportional to the recording velocity between said nozzle and said electrode member.

15. An apparatus as defined in claim 9 wherein said potential applying means applies a high voltage pulse having a pulse width substantially proportional to the recording velocity between said nozzle and said electrode member.

16. An apparatus as defined in claim 9 further comprising means for applying a pulsating pressure to said liquid marking medium to facilitate formation of a convex meniscus at the exit of said nozzle, and wherein said control signal is also utilized to operate said pulsating pressure applying means.

17. A non-impact, liquid jet recording apparatus for use in an X-Y plotter of a type which comprises a support table adapted to support a recording medium thereon, an X-axis carriage mounted for parallel movement across said support table in the direction of the X-ordinate, a Y-axis carriage mounted on said X-axis carriage for movement in the direction of the Y-ordinate, a first drive unit for moving said X-axis carriage and a second drive unit for moving said Y-axis carriage, said apparatus comprising:

a recording head rigidly carried by said Y-axis carriage and including a nozzle through which a liquid marking medium is jetted onto the recording medium, means for supplying said liquid marking medium as the exit of said nozzle, and an electrode member situated above the recording medium in alignment with said nozzle and supported for movement close to and away from the exit of said nozzle;

potential applying means for applying a potential between said nozzle and said electrode member for establishing therebetween an electrostatic field required to attract said liquid marking medium from the exit of said nozzle towards said recording medium;

circuit means operable upon receipt of first and second signals which are respectively fed from said first and second drive units representing the individual velocities of movement of said carriages to generate a control signal; and means energizeable upon receipt of said control signal to move said electrode member in a proportional manner relative to the recording velocity which is defined by the square root of the sum of the second powers of the velocities of movement of said carriages.

18. An apparatus as defined in claim 17 wherein said circuit means comprises a signal generator which, upon receipt of first and second signals which are respectively fed from said first and second drive units representing the individual velocites of movement of said carriages, generate said control signal indicative of the recording velocity.

19. An apparatus as defined in claim 18 further comprising means for applying a pulsating pressure to said liquid marking medium to facilitate formation of a convex meniscus at the exit of said nozzle.

* * * * *